US006953917B2

(12) United States Patent
Chenault

(10) Patent No.: US 6,953,917 B2
(45) Date of Patent: Oct. 11, 2005

(54) SYSTEM AND METHOD FOR ENSURING THE QUALIFICATION OF A WORKMAN TO PERFORM A TASK HAVING ESTABLISHED REQUIRED STANDARDS

(76) Inventor: David O. Chenault, 606 N. Maple St., Butler, MO (US) 64730

( * ) Notice: Subject to any disclaimer, the term of this patent is extended or adjusted under 35 U.S.C. 154(b) by 397 days.

(21) Appl. No.: 09/829,760

(22) Filed: Apr. 10, 2001

(65) Prior Publication Data

US 2001/0050278 A1 Dec. 13, 2001

Related U.S. Application Data

(60) Provisional application No. 60/195,932, filed on Apr. 10, 2000.

(51) Int. Cl.$^7$ ............................................. B23K 10/00
(52) U.S. Cl. ....................... 219/497; 219/535; 219/501; 285/288.1
(58) Field of Search ................................ 219/535, 497, 219/455, 492, 501, 505; 285/288.1, 288.11, 286

(56) References Cited

U.S. PATENT DOCUMENTS

| | | | |
|---|---|---|---|
| 3,867,769 A | * | 2/1975 | Schow et al. ............ 219/131 R |
| 4,486,650 A | | 12/1984 | Bridgstock et al. .......... 219/544 |
| 4,684,789 A | | 8/1987 | Eggleston .................... 219/497 |
| 4,795,877 A | | 1/1989 | Bridgstock et al. ......... 219/109 |
| 4,837,424 A | * | 6/1989 | Nussbaum et al. .......... 219/494 |
| 4,947,012 A | | 8/1990 | Minarovic ................... 219/535 |
| 4,994,655 A | | 2/1991 | Handa et al. ................ 219/535 |
| 5,116,082 A | | 5/1992 | Handa et al. ................. 285/21 |
| 5,130,518 A | | 7/1992 | Merle .......................... 219/497 |
| 5,138,136 A | | 8/1992 | Moreau et al. .............. 219/505 |
| 5,170,042 A | | 12/1992 | Bunn ........................... 219/497 |
| 5,228,186 A | | 7/1993 | Brettell et al. ................. 29/611 |
| 5,462,314 A | | 10/1995 | Goto et al. ..................... 285/21 |
| 5,500,510 A | | 3/1996 | Kumagai ..................... 219/505 |
| 5,620,625 A | * | 4/1997 | Sauron et al. ............... 219/494 |
| 5,779,843 A | | 7/1998 | Kumagai et al. ......... 156/274.2 |
| 5,951,902 A | | 9/1999 | Goodman et al. ........... 219/544 |
| 6,018,136 A | * | 1/2000 | Ohmi et al. ............ 219/130.01 |

FOREIGN PATENT DOCUMENTS

| | | | | |
|---|---|---|---|---|
| CH | 668 741 A5 | 1/1989 | ....................... 65/2 |
| EP | 0 082 451 A1 | 12/1982 | ....................... 47/2 |
| EP | 0 299 833 A1 | 6/1988 | ..................... 65/34 |
| JP | 7-260082 | 10/1995 | ....................... 47/2 |
| JP | 9-292084 | 11/1997 | ....................... 47/2 |

OTHER PUBLICATIONS

Hobart institute of Welding Technologh, course descritpions, pp 1–37, 1930–2005.*

* cited by examiner

Primary Examiner—Mark Paschall
(74) Attorney, Agent, or Firm—Gable & Gotwals; Paul H. Johnson

(57) ABSTRACT

A method and system for ensuring compliance with regulatory requirements to train, test, perform, evaluate and document identified covered tasks and provide the means to meet governmental and/or industrial standards including measuring applicable physical parameters, recording the steps involved and values of the parameters measured, comparing the steps and values recorded for each covered task with pre-established approved standards and providing a record identifying covered tasks that meet or that do not meet pre-selected approved standards.

32 Claims, 7 Drawing Sheets

SYSTEM AND METHOD FOR ENSURING THE QUALIFICATION OF A WORKMAN TO PERFORM A TASK HAVING ESTABLISHED REQUIRED STANDARDS

REFERENCE TO PENDING APPLICATIONS

This application is based on U.S. Provisional Application Ser. No. 60/195,932 entitled, "System for Ensuring Department of Transportation and Local Distribution Company Compliance in the Joining of Polyethylene Pipes and Fittings", filed Apr. 10, 2000. This and the corresponding provisional application are not related to any other pending United States or international patent application.

REFERENCE TO MICROFICHE APPENDIX

This application is not referenced in any Microfiche Appendix.

BACKGROUND OF THE INVENTION

1. Field of the Invention

The present invention relates to a multifunction system that provides; (1) local distribution company tailored instructions for performing identified covered tasks; (2) training programs foe teaching operators to correctly perform covered tasks; (3) testing and evaluation programs to determine the qualification of operators to perform covered tasks and (4) detailed records of performed tasks.

2. Description of the Prior Art

Mechanical, heat fused (conventional/electric heat weldable) fittings formed of thermoplastic material have been in commercial use for many years. The most recent are electro-fusion fittings include in-line couplings, saddles and socket fittings. Such fittings generally have an electric resistance heating coil or an electric element positioned adjacent the interior surface of the fitting which is to be fusion-welded to one or more other thermoplastic members. The electric resistance heating element usually is in the form of a coil resistance wire embedded in the thermoplastic material of the fitting. The fitting typically includes external electric contacts that communicate with the resistance wire. By means of conductors extending from electrical contacts, electrical energy can be applied to the electrical coils. As current flows through the electric resistance wire, heat is generated that raises the temperature of the mating surfaces of the fitting and adjacent plastic element to which the fitting is to be fused. When the temperature of the mating surfaces both reach a molten state thermoplastic fusion occurs. When the molten surfaces cool, the components, that is a fitting plus a second element such as a length of pipe, are integrally joined.

Heat weldable thermoplastic fittings that employ electrical energy are described in U.S. Pat. Nos. 4,147,926 and 4,349,219. These patents are incorporated in this application by reference.

The quality of the weld which results from electro-fusion is primarily dependent on the correct quantity of electric power supplied to the heating element or elements of the fitting. If too little electric power is supplied, too little heating takes place and an inadequate low strength weld results. If too much electric power is supplied, the fitting and the plastic member to which the fitting is welded can be deformed so that a good weld does not result. Other factors that effect the quality of an electro-fusion procedure include heating element abnormalities that is, short circuits, poor alignment between the fitting and the plastic pipe or plastic member to which the fitting is being welded, poor contact between the surfaces to be fused, and so forth.

Others have designed and made commercially available control systems for supplying electric power to electric heat weldable thermoplastic fittings. When electro-fusion products first came on the market, they were typically controlled manually by an operator. That is, the operator manually turned on the supply of power to the fitting and turned it off, depending on experience and visual observations of the fittings as to the proper length of time to apply energy to the fitting to obtain successful fusion. At the present time, control apparatus has been developed so that the operator programs the apparatus to supply a pre-determined quantity of electric energy to the heating element or elements of the fitting in accordance with the shape, size and character of the fitting. In addition, others have devised fittings for electro-fusion that have heat sensors formed when the fitting is manufactured. The sensors detect heat produced by the heating element or elements to thereby determine when the mating surfaces to be fused have reached molten temperature. For background information relating to electro-fusion devices that have integral heat sensors, reference may be had to U.S. Pat. No. 4,486,650 that issued on Dec. 4, 1984. This patent is incorporated herein by reference.

When polyethylene plastic pipe was first introduced to the commercial market it was used primarily as conduits for water, either water under pressure or waste water. As experience has been gained in the quality control of installation of thermoplastic pipe and as the quality of thermoplastic pipe and fittings have improved, thermoplastic pipe is now also frequently employed for transmitting gas, particularly natural gas distribution systems to residential and commercial customers. Since natural gas is combustible and highly explosive, the Department of Transportation (DOT) has established regulations regarding the use of thermoplastic pipe for natural gas and has established safety control procedures regulating the construction of natural gas systems. These procedures include regulations regarding joining procedures including mechanical and heat fusion (conventional/electro) for connecting polyethylene fittings to plastic pipe. Further, DOT has mandated certain training and qualification requirements for those authorized to perform the covered task of joining procedure of fittings and plastic pipe.

For further background information relating to electro-fusion of thermoplastic pipe and fittings, reference may be had to the following previously issued patents:

| PATENT NO. | INVENTOR | TITLE |
|---|---|---|
| 4,486,650 | Bridgstock et al. | Electro-Fusion Fitting and Control Apparatus Therefor |
| 4,684,789 | Eggleston | Thermoplastic Fitting Electric Welding Method and Apparatus |
| 4,795,877 | Bridgstock et al. | Fault Detecting Device for Welded Pipe Joints |
| 4,947,012 | Minarovic | Electro-fusion Marker |
| 4,994,655 | Handa et al. | Electro-Fusion Joint |
| 5,116,082 | Handa et al. | Electro-fusion of Electro-fusion Joint, Method of Confirming State of Fusion and Fusion Joint Suitable for Use int eh Methods |
| 5,130,518 | Merle | Electric Welding Apparatus for Automatically Welding Heating Coil Fittings |

-continued

| PATENT NO. | INVENTOR | TITLE |
|---|---|---|
| 5,138,136 | Moreau et al. | Method, Circuit and Apparatus for Supplying an Electrical Current to a Resistive Heating Element |
| 5,170,042 | Bunn | Identification of Electro-Fusion Fittings |
| 5,228,186 | Brettell et al. | Method of Manufacturing Electro-Fusion Fittings |
| 5,462,314 | Goto et al. | Electro-Fusion Fitting Having a Solid Embedded Heater with Perpendicular Projections |
| 5,500,510 | Kumagai | Method of Automatically Controlling the Fusion Process Between Thermoplastic Articles |
| 5,779,843 | Kumagai et al. | Method of Fusion Welding Resin Articles Difficult to Melt |
| 5,951,902 | Goodman et al. | Method and Apparatus for Electrofusing Thermoplastic |
| JP 7-260082 | | |
| JP 9-292084 | | |
| EP 0 082 451 | Thalmann et al. | Process and Turn Out to Weld from Line Items |
| EP 0 299 833 | Nussbaum et al. | Process and Machine for the Welding between them of Plastic Parts Comprising a Winding Integer |
| CH 668 741 | Sturm | Process and Device to Weld Plastic Shaped Parts |

SUMMARY

This invention provides a process of ensuring that installations of thermoplastic fittings to plastic pipe meet governmental and/or industrial regulations and standards. These methods include a sequence of operating procedures involving, as a first step for each installation, providing physical parameters employed in the covered task of joining plastic fittings and pipes. The operator is instructed to properly perform each of the steps which make up the joining procedure for each type of joint. Tests are utilized to measure operator competency when performing the covered task of joining plastic pipe and fittings by the various joining methods. For electro-fusion, parameters include not only pipe and fitting preparation, but also the value of a voltage applied during the welding process, the current level employed in the welding procedure, the time during which a voltage is applied to the electric heat welding thermoplastic fitting, the ambient temperature, clamp and cooling time and so forth. The measurement of physical parameters may also include information from a bar code carried by the thermoplastic fitting.

In the next step in the process the measured physical parameters are recorded. This is best accomplished utilizing a personal computer having adequate data storage. Next, the recorded values of the measured parameters for each installation are compared by computer, with pre-established approved standards. These pre-established standards or procedures may provide detailed requirements for each class, type, style and size of fitting and these parameters are modified according to environmental considerations, such as temperature when a heat fusion is made. Mechanical joining is not as temperature sensitive.

The measured parameters are compared to pre-established approved standards and a record is provided of the comparison identifying installations that meet and/or those that do not meet such pre-selected approved standards.

The recorded information can be used by governmental agencies, such as the Department of Transportation (DOT), or by private industry, such as gas or water utilities, as a way of maintaining quality control of installation of thermoplastic pipe systems and operator proficiency.

The invention further includes a system for controlling the application of electrical energy to an electric heat weldable thermal plastic fitting to weld the fitting to a thermoplastic pipe. This system includes a voltage source which may include a battery or batteries with corresponding electrical components for transforming the DC voltage available from a battery source into an AC voltage of different levels as required in the system.

A microprocessor operated voltage control circuit is connected to a voltage source having an output that is removably connectable to an electric heat weldable thermoplastic fitting by which the required voltage is applied to the fitting. A "real-time" graph of applied voltage and current is generated for operator evaluation and documented for future evaluations.

An amperage measurement circuit is associated with the voltage control circuit for determining current flow through the heat weldable thermoplastic fitting thereby obtaining an accurate measurement of electrical energy actually consumed by the fitting during a welding procedure.

An input system is connected to the voltage control circuit to impart characteristics of the weldable thermoplastic fitting and ambient conditions. The voltage control system serves to apply proper voltage for a determined time to complete thermoplastic welding of the fitting to a thermoplastic pipe.

By the application of the systems and the processes of this invention, workmen can be trained to follow correct procedures when performing any type of joint. Training exercises can be conducted in the form of simulations—that is, wherein actual electric weldable thermoplastic fittings are employed but wherein the trainee undergoes all the steps that otherwise would be encountered in completing a thermoplastic welding procedure but actual AC voltage and current is simulated. Further, the principles and systems of this invention may be employed to maintain permanent records of the installations of the different types of joining thermoplastic fittings in constructing a gas or water system, which records can be employed in evaluating causes of failures to thereby improve techniques of joining thermoplastic fittings.

A more complete understanding of the invention will be obtained from the following detailed description of the preferred embodiment taken in conjunction with the attached drawings.

DESCRIPTION OF THE DRAWINGS

FIG. 1 is representative of the prior art.

DETAILED DESCRIPTION OF A PREFERRED EMBODIMENT

Figure 1:
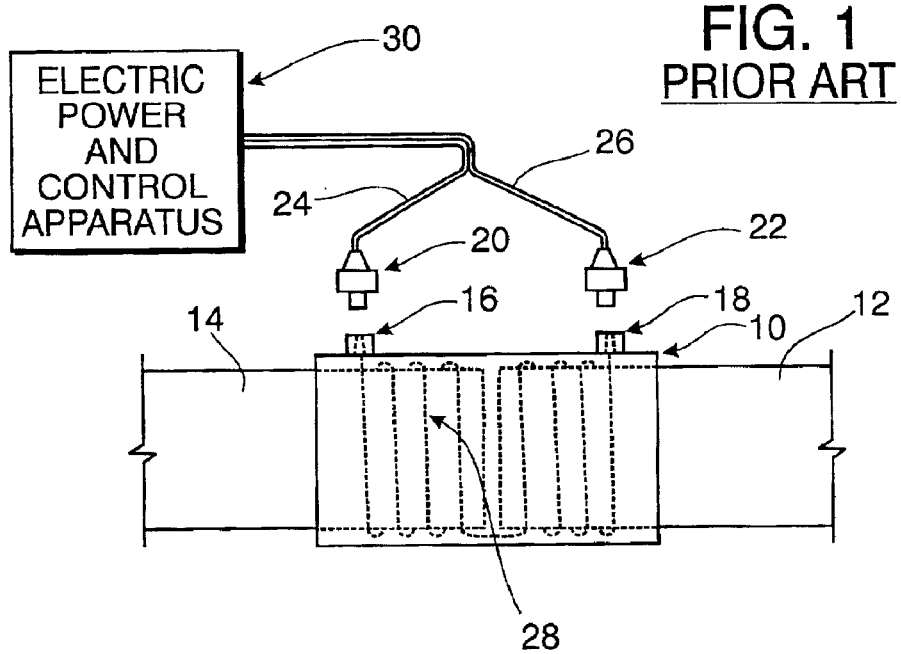
FIG. 1 is a rudimentary system showing how two lengths of pipes are joined by a coupling using electro-fusion.
Figure 2:
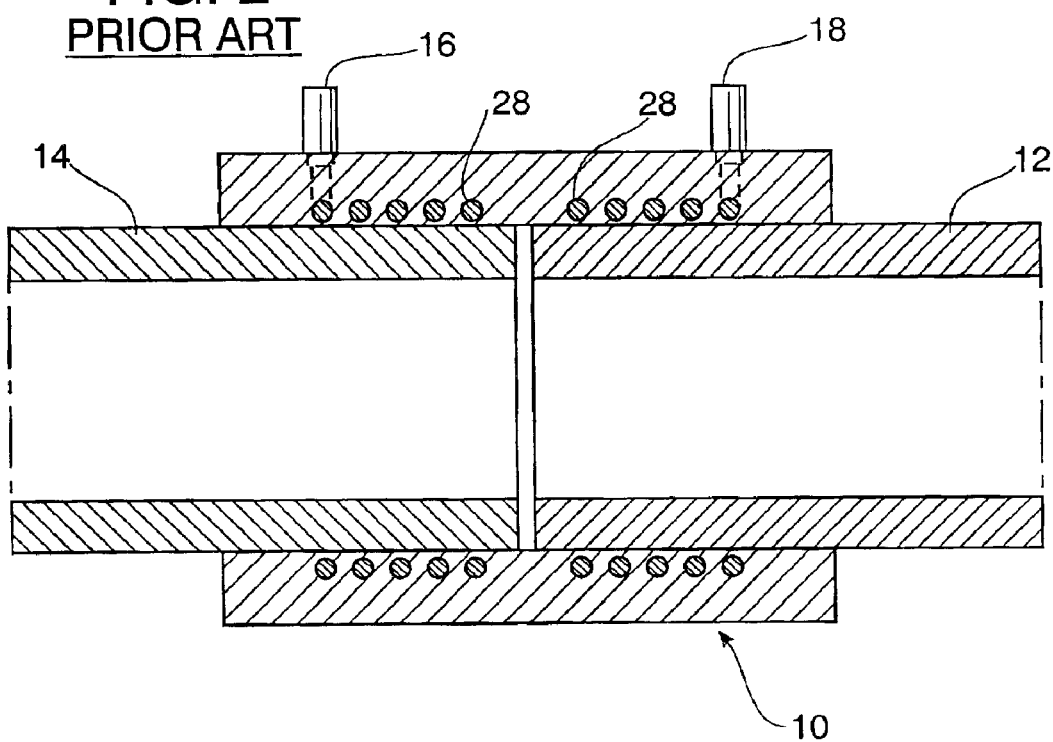
FIG. 2 is an enlarged cross-sectional view of the end portion to two lengths of plastic pipe and the fitting of FIG. 1 showing the basic system by which electro-fusion functions.

Referring to the drawings and first to FIGS. 1 and 2, background information is provided that sets the stage for the unique improvements that constitutes the invention. FIG. 1 shows an electric heat weldable thermoplastic sleeve 10 that receives the end portion of first and second pipe sections 12 and 14. Sleeve 10 includes a pair of electrical contact connectors 16 and 18. The sleeve connectors 16 and 18 are adapted to removably receive electrical contactors 20 and 22. Contactor 20 is connected to a conductor 24 and in like manner, contactor 22 is connected to a conductor 26.

The fitting which is in the form of sleeve 10 includes an electric resistance heating element 28, one end of which is connected to sleeve first connector 16 and the other end to sleeve second connector 18. Conductors 24 and 28 extend to an electric power and control apparatus generally designated by the numeral 30.

When the end portion of plastic pipes 12 and 14 are inserted into sleeve 10 the sleeve can be thermally fused to the pipe end portions by raising the mating surfaces to molten temperature. That is, if the external circumferential surfaces of the end portion of pipes 12 and 14 and the internal circumferential surfaces of sleeve 10 are simultaneously raised to molten temperatures, the molten plastic expands causing the two surfaces to intermix and when the plastic cools to ambient temperature and returns to a solid state, the end portion of pipes 12 and 14 are then integrally fused to sleeve 10. In this way, pipes 12 and 14 are joined together by sleeve 10. The joint, when properly performed, provides a connection between pipes 12 and 14 that has a tensile strength and bursting pressure greater than that of the pipes themselves. Thus the pipes can be joined to thereby provide a secure conduit for conducting liquids or gases. A secure conduit system is mandatory when the fluid being conducted is natural gas or any other gas or liquid that is combustible and/or explosive. The same result can be said for joining thermoplastic using mechanical and conventional heat fusion methods. They too, are stronger than the pipe they are joining.

Because of the hazards that can result from improperly joining a fitting, such as a coupling as shown in FIGS. 1 and 2 to plastic pipe the Department of Transportation has established guidelines and procedures to be employed. The quality of a joint is primarily dependant on two factors, that is, first, the quality of the thermoplastic pipe and the fittings themselves and second, and most important the experience and skill of the individual that is responsible for making the fitting connection.

The invention herein provides an energy management center of hardware and software that performs joining of polyethylene pipe and fittings while providing a method of achieving and maintaining Department of Transportation (DOT) code compliance. The system and the process herein accomplish this result by satisfying the training, testing, performance and educational requirements mandated by the DOT operator's qualification rule. By the system of this invention, the entire process to obtain operator qualification or re-qualification is documented for immediate or future reference or analysis. The energy management center accomplishes code compliance for mechanical and heat fusion (conventional and electro-fusion) joining of thermoplastic pipe.

Figure 3:
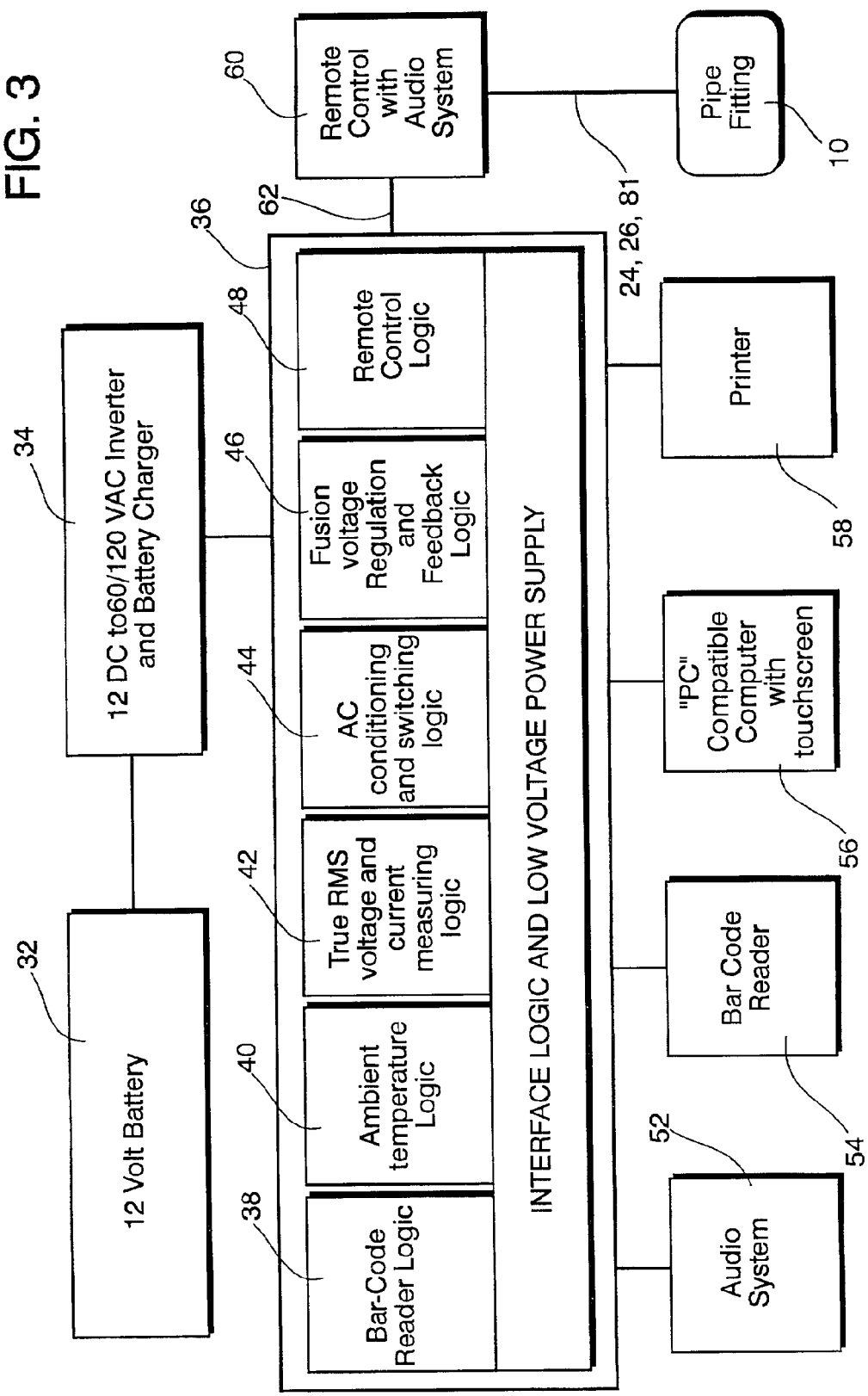
FIG. 3 is a functional block diagram showing the basic components of a system for practicing this invention for teaching procedures and evaluating results of joining plastic pipe and fittings.

The invention provides a superior and unique method of utilizing required electrical power at remote field job sites to carry out the task of heat fusion of polyethylene plastic pipe and fittings. The system utilizes a DC source such as a twelve volt battery 32 as indicated in FIG. 3. The twelve volt DC source available from battery 32 can be available from field crew vehicles or from a separately utilized battery. A twelve volt DC to one hundred and twenty volt AC inverter 32 provides all necessary 120 volt AC requirements. In a typical electro-fusion operation utilizing fittings commonly available on the market today, the power supply 34 will provide an AC voltage in the twenty four to forty volt range at high current requirements, that is, twenty to fifty amps to provide sufficient power to make a proper electro-fusion and to comply with parameters established by electro-fusion fitting manufacturers.

The control apparatus utilized in the system of this invention employs an energy management center 36 as seen in FIG. 3. The energy management center includes logic for a bar code reader 38, ambient temperature logic, current measuring logic circuitry 42, air conditioning and switching logic 44, fusion voltage regulator and feed back logic 46 and remote control logic 48. In FIG. 3, a pipe fitting such as a sleeve 10 as illustrated in FIGS. 1 and 2, is supplied by voltage at a pre-determined level and pre-determined time, the voltage passing from energy measurement center 36 to sleeve 10.

Connected to energy management system 36 is an audio system 52 that permits members of a team to communicate with each other. For instance, frequently battery 32, converter 34 and energy management center 36 will be located in a truck whereas the sleeve 10 is a part of a piping system located in a ditch that is spaced from the truck. When communication is required between an operator that may be in a ditch monitoring sleeve 10 and an operator located adjacent the energy management center in a truck, audio system 52 is utilized.

In addition, connected with energy management center 36 is a bar code reader 54 that can be used to read the bar code that is typically provided on electro-fusion fittings as manufactured at the present time, the information from bar code reader being fed to energy management center 36 for automatically controlling the application of prescribed voltage to a sleeve 10. Connected to energy management center 36 is a personal computer (PC), such as a laptop computer, with a touch screen by which commands and data can be entered into the system to cause it to perform as required.

Putting it another way, in the practice of the invention instructions to be carried out by the system are inputted by way of the touch screen portion of a personal computer 56.

A printer 58 is used to provide a hard copy or fixed permanent copy of records of a fusion process, or of a trial fusion process or simulation when the invention is used for training and/or testing purposes.

Figure 4:
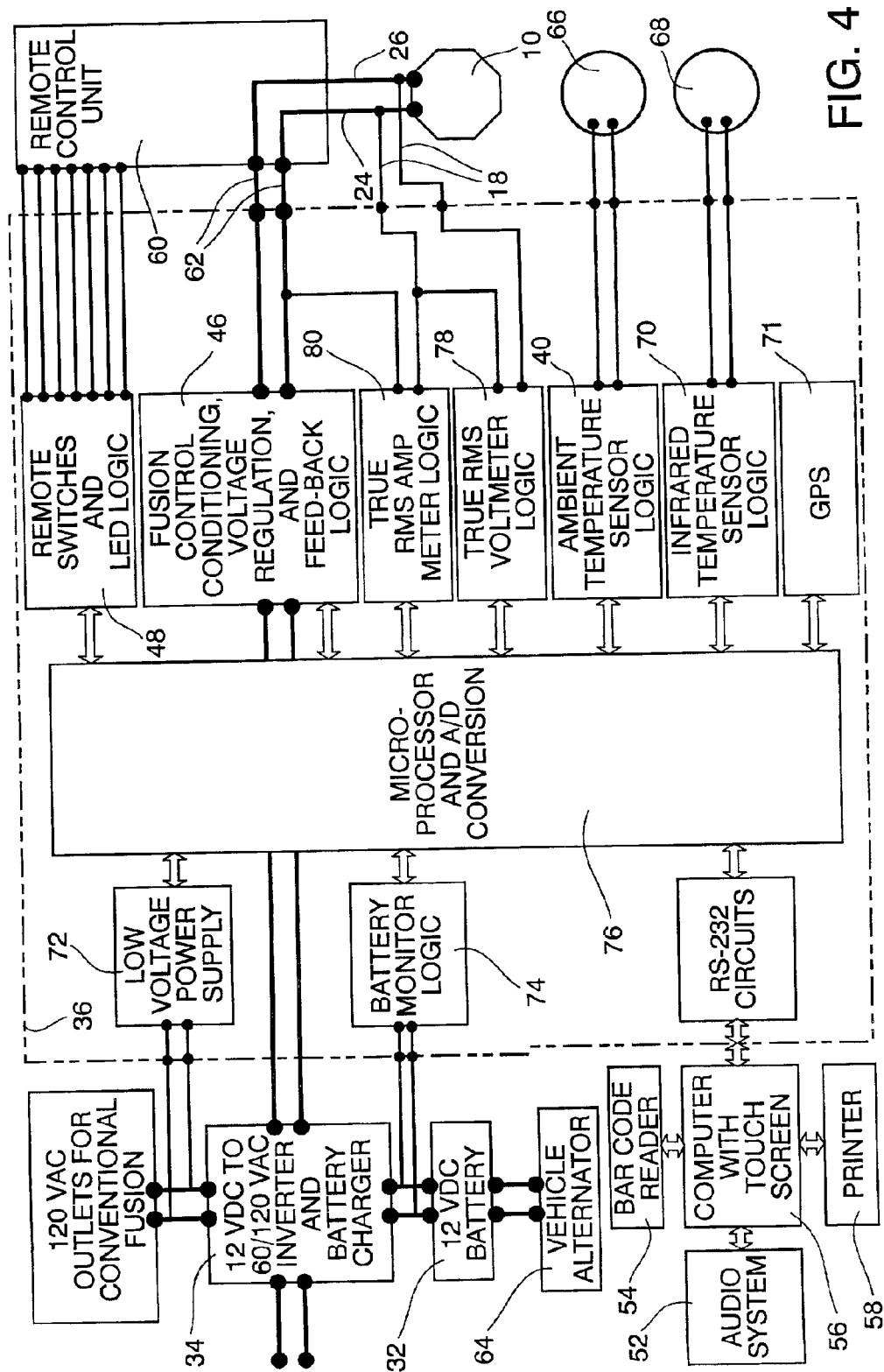
FIG. 4 is a block diagram showing a system for practicing the invention as will be described herein.

As shown on FIGS. 3 and 4, a remote control unit 60, that is preferably also provided with an audio system, is connected by means of a cable 62 to energy management center 36. The function of remote control unit 60 is to enable an operator that may be at a substantial distance, such as at one hundred feet or so from a truck in which the energy management center 36 is located to operate the system during a fusion operation. The remote control has a liquid crystal display working in conjunction with the audio to visually prompt the operator at the joining site the proper sequence of joining steps assuring procedure compliance.

FIG. 4 shows that the system also preferably includes a vehicle alternator 64 to keep battery 32 charged. Further, in the system as illustrated in the diagram of FIG. 4, an ambient temperature sensor 66 is employed to detect the ambient temperature which indicates the temperature of the pipes and fittings prior to the fusion process so that the control circuitry can properly calibrate the amount of electrical energy required to produce the required heat to obtain fusion temperature of the surfaces of the pipes and the fittings to be joined. Further, when in the conventional fusion mode an infra-red sensor 68 connects to an infra-red temperature logic circuitry 70 that is within the energy management center 36. The function of infra-red sensor 58 is to detect and provide an indication of the temperature of the heater surface by the amount of infra-red radiated as a way to verify that fusion temperatures have been obtained during the conventional fusion process. A standard 120 AC volt outlet is also present to provide electricity for lights and other tools.

In addition, remote control 60 contains a Global Positioning System (GPS) 71 that feeds into micro processor 76 enabling the operator to locate and record the position of the joining activity. This will be used in conjunction with the operator's maps of the gas distribution system.

FIG. 4 shows other circuitry components used in energy management center 36 including a low voltage power supply 72 that enables the system to operate off of a one hundred and twenty volt AC outlet if voltage from battery 32 is not available. A battery monitor logic 74 circuit functions to monitor the voltage output of battery 32 and to regulate voltage applied to the system.

The energy measurement center 36 is controlled by a microprocessor 76 that in turn is controlled by software designed to achieve the required functions of the energy management system. These required functions include not only actually doing electro-fusion welding but also monitoring the steps of a welding procedure to provide a record of the procedure. The record can be used as an evaluation of the effectiveness and efficiency of controlling the system whereby the skill of an operator can be judged. Further, the software in microprocessor 76 can establish test procedures wherein an operator can go through the steps of a fusion without actually performing a fusion and the correctness of the steps can be evaluated both as a training procedure and as a qualification procedure.

To monitor the voltage that is fed to a sleeve 10 through cable 62 a volt meter logic circuit 78 is connected to monitor the current flowing to remote control unit 60. For this purpose, an amp meter logic circuit 80 is employed. The amp meter logic circuit 80 functions by measuring the voltage drop in one leg of cable 62 from a point within the energy management center 36 to a point adjacent sleeve 10. The voltage drop in this length of cable thereby provides an accurate indicator of the current flow through the cable and consequently the current flow through sleeve 10. Conductors 81 that are used to monitor the voltage at fitting 10 and current flow through the fitting are carried in parallel with conductors 24 and 26 to remote control with conductors 24 and 26 to remote control unit 60 and within cable 62 to energy management center 36 and a liquid crystal display to provide visual information.

Figure 5:
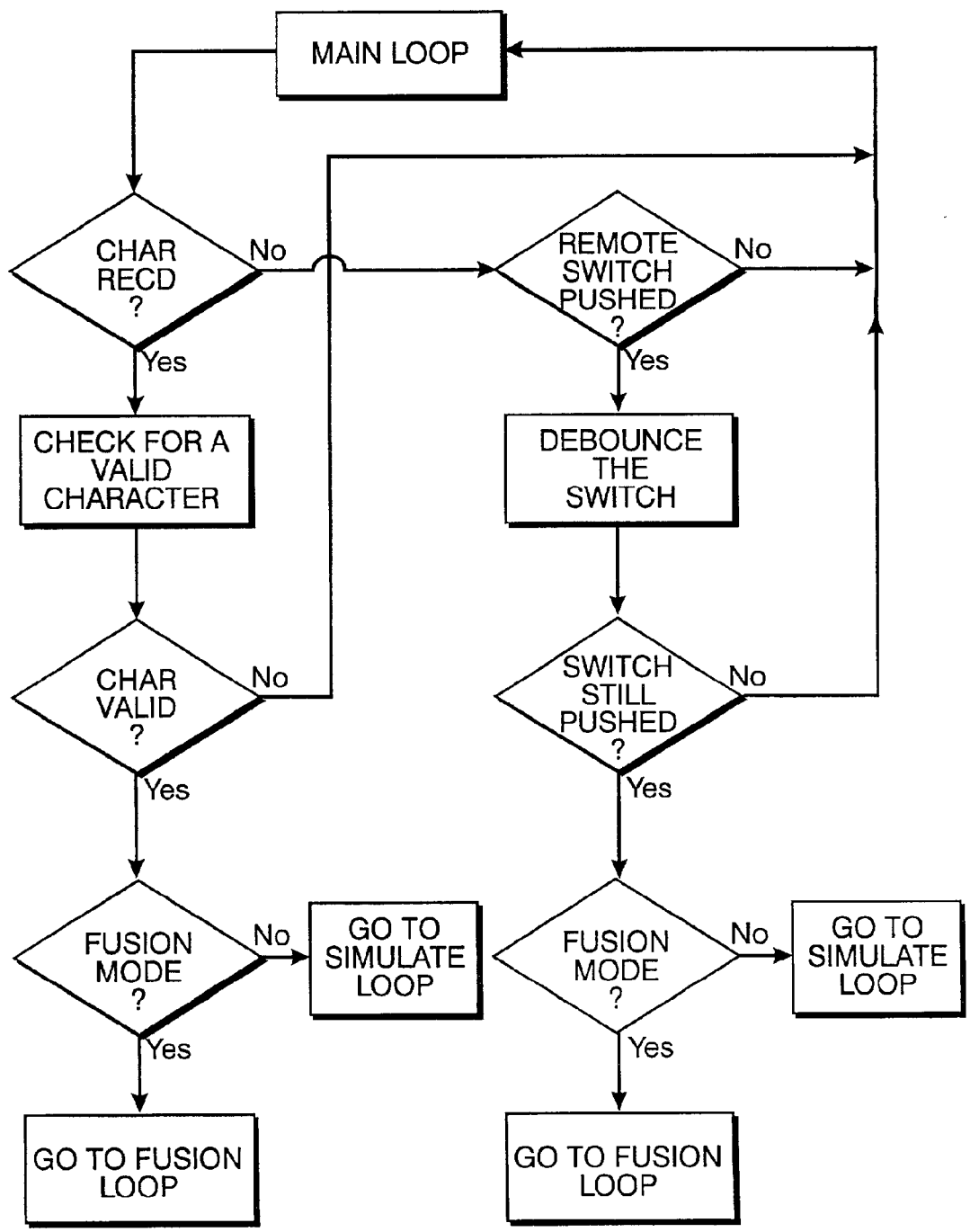
FIG. 5 is a flow chart showing the steps involved in performing an electro-fusion event in which the system of this invention is in the main or idle mode.
Figure 6:
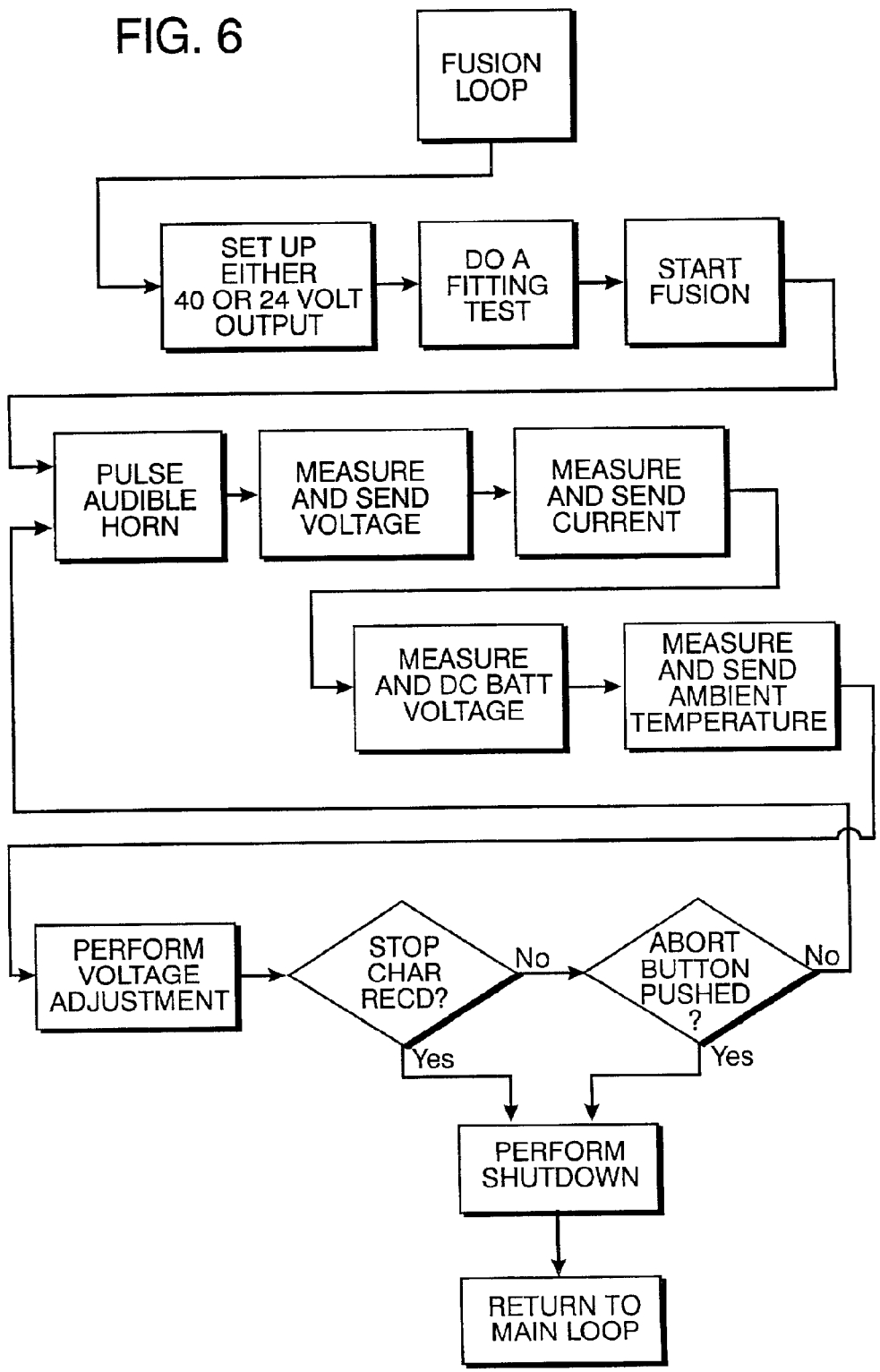
FIG. 6 is a flow chart of the steps by which the system of this invention functions when in the fusion mode.
Figure 7:
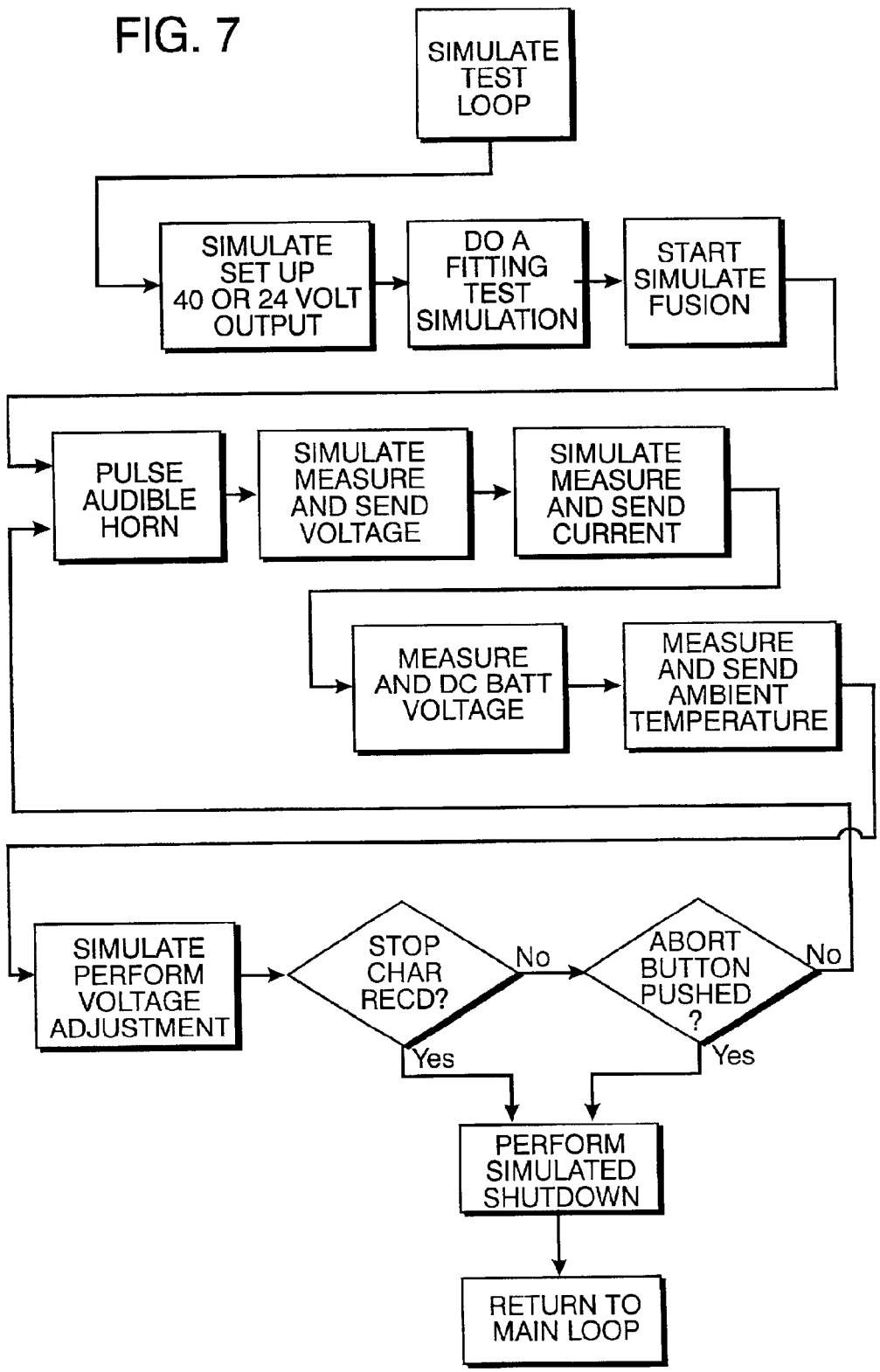
FIG. 7 is a block diagram showing the steps the system uses when in the training mode, that is, to simulate the fusion of a fitting rather than to actually perform a fusion, the simulation being useful in training and/or evaluating a student's performance. Gas distribution companies have obtained Department of Transportation (DOT) approval to use simulation. This invention uniquely enables the operator to simulate the electro-fusion and comply with the DOT rule.

FIGS. 5, 6 and 7 are logic flow diagrams showing the sequence of steps carried out in the various modes of the invention. FIG. 5 shows the basic steps when the system is in the main or idle mode. FIG. 6 when in the fusion mode that is, when fusion is actually to be performed. FIG. 7 when the system is in the simulate mode that is, when the steps of achieving fusion are carried out but no actual fusion occurs, the sequence of steps of FIG. 7 being used to train and/or evaluate an operator.

Figure 8:
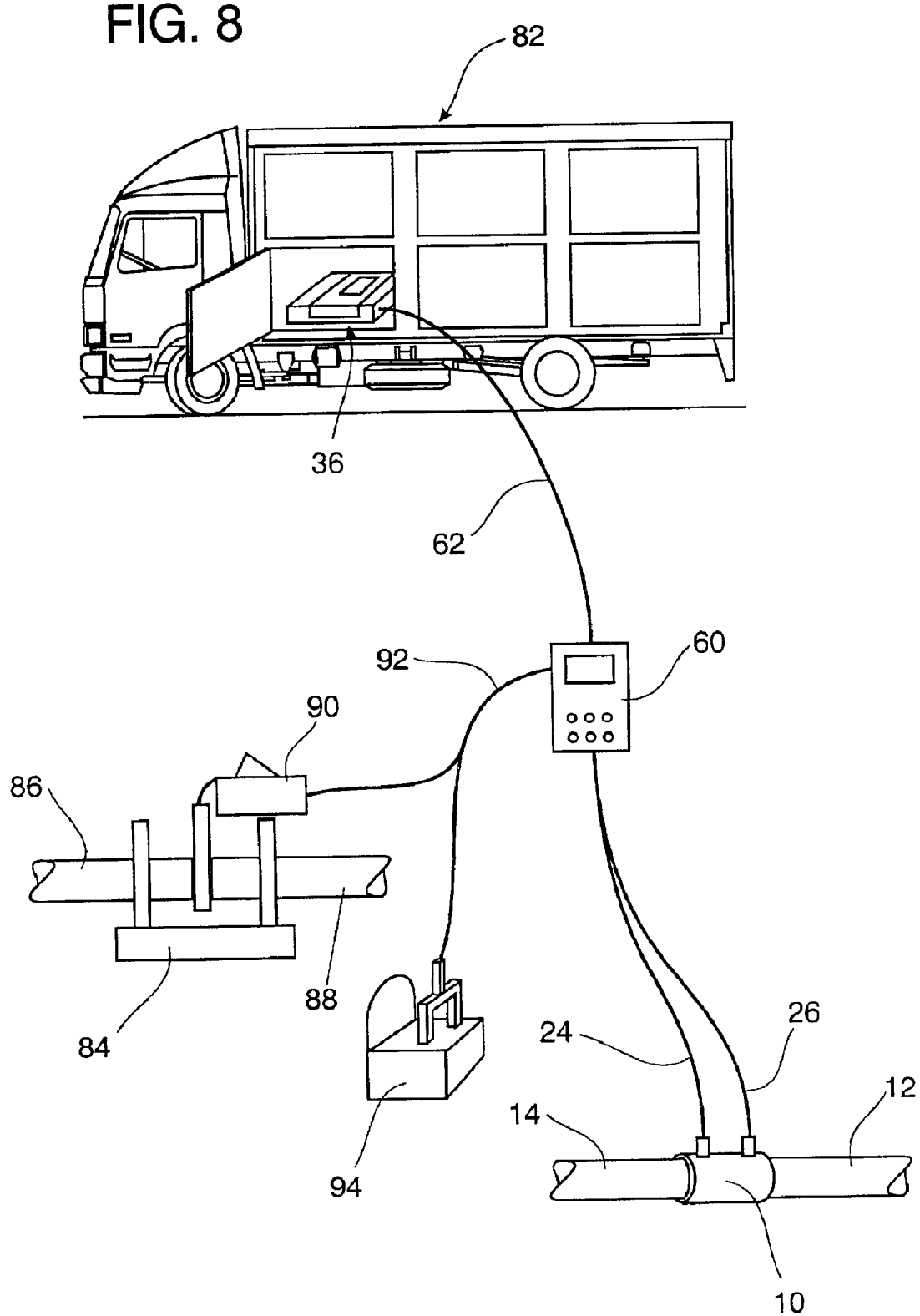
FIG. 8 illustrates the major components of a system of this invention at a job site.

FIG. 8 diagrammatically illustrates the spacial relationship between components employed in the invention. A truck 82 carries energy management center 36 that has extending from it cable 62 that connects with remote control unit 60 which in turn has conductors 24 and 26 connected to sleeve 10, as illustrated diagrammatically in FIG. 4. Remote control unit 60 allows an operator that is adjacent sleeve 10 (such as a coupling fitting as shown in FIG. 2) to join together lengths of pipe 12 and 14 and permits the operator to be in close physical proximity to the electro-fusion procedure. Remote control unit 60 has facilities to allow the operator to start the electro-fusion procedure, stop the procedure if something obviously is awry and to test the procedure. In addition, remote control unit 60 typically includes audio equipment allowing an operator to communicate by voice with a workman in truck 82 that is in command of energy management center 36. The ambient temperature sensor 66, infra-red sensor 68, global positioning sensor 71 and portions of audio system 52 are all preferably mounted in remote control unit 60.

FIG. 8 also shows that energy management center 36 can be employed to do conventional fusion, that is, fusion that does not employ an electro-fusion fitting. An example of conventional fusion is butt-fusion of pipes where the ends of adjacent pipes are heated to fusion temperature and forced into contact with each other and held until the ends of the pipe cool to a solid state. Conventional fusion, particularly butt-fusion, is a common way of joining together lengths of polyethylene pipe in a way that does not require any fittings. Butt-fusion technology includes the use of a butt-fusion machine 84 that grasps the end portions of lengths of pipe 86 and 88. The butt-fusion machine has provisions whereby the ends of the pipe can be moved towards and away from each other. To prepare the pipes end for butt-fusion a facer 90 is positioned between the pipes and the pipes move so that the ends are in contact with opposite surfaces of the facer. The facer is rotated by means of an electric motor using typically one hundred and twenty volts of power that can be supplied by a cable 92 extending from remote control unit 60. After the ends are faced the pipe is spread apart, allowing the facer to be removed prior to inserting the heater, its surface temperature is checked and recorded via an infra red thermometer, an accessory of the remote control. The pipe is moved so that both the opposed ends contact opposite sides of the heater. By applying electrical energy to the heater that is available by cable 92 the end surfaces of the two lengths of pipe are simultaneously brought to molten state. Thereafter the pipes are moved apart allowing heater 94 to be removed and then immediately the pipes are moved towards each other to abort the ends so that the molten end faces are forced into contact with each other and held in this position for the short time required for the ends of the pipe to cool to below the molten state, that is to a solid state, leaving the lengths of pipe fused to each other. FIG. 8 illustrates how energy management center 36 can be employed with both conventional fusion and electro-fusion. Operating procedures for proper installation of mechanical fittings can also be employed.

The unique design of energy management center 36, including associated hardware and software, to perform the approved joining procedures of polyethylene pipe and fittings and also provides the process of achieving and maintain Department of Transportation (DOT) code compliance by operators. This process is accomplished by satisfying the training, testing, performance and evaluation requirements mandated by the DOT. The entire process of operator qualification or re-qualification is documented by energy management center 36 for both immediate and future reference and analysis.

Energy management center 36 contains a complete interactive training program to provide and ensure an operator a complete and satisfying learning experience. The system is designed to provide consistency in training by ensuring that the same information is presented in the same manner each time it is initiated while taking into consideration the operator's individual training needs and requirements. Training is composed of distinct steps which allow the operator to progress through the training slowly or rapidly depending upon his or her learning capacity.

The operating procedures are presented in video provided by energy management center 36 as interactive multi-media demonstrations. The procedures are controlled by the operator when interacting with the energy management center's touch screen. The operator can start, stop or replay the demonstration until complete understanding and confidence is achieved. All necessary information required to properly join polyethylene pipe and fittings are contained within the system. Each operator's standards and procedures specific to their operation are included by appropriate software, within the training programs to assure DOT compliance.

The training program includes tests designed to measure the operator's competence. Interactive testing provides each individual operator immediate feedback on their progress as they increase their knowledge of the specific operating procedures for properly joining polyethylene pipe and fittings. Each operator interacts with the training program by selecting answers to questions through the energy management center's touch screen. A correct answer allows the operator to continue to the next topic. An incorrect answer results in a review of the material. All questions must be answered correctly before the operator is considered qualified to perform joining operations. Each time an operator interacts with the touch screen, his or her response is recorded to determine a test score that can be used for future evaluation.

After successfully completing a training session an operator must perform an actual joint (mechanical or heat fusion) to become qualified. Energy management center 36 provides the operator, both audibly and visually, all the steps necessary for performing conventional fusion, electro-fusion and mechanically joining polyethylene pipes and fitting.

After performing a required joint, an operator becomes his own quality assurance inspector and evaluates the quality of his or her work. The first fusion evaluation is visual. A color monitor provided by energy management center 36 displays examples of a properly made heat fused or mechanical joints. The example is used by the operator to compare with his or her joint. If the joint appears to pass the visual evaluation, the operator is instructed by the energy management center to make a second joint evaluation. The second evaluation is destructive. The energy management center demonstrates to the operator the proper method of performing a destructive test of a joint by showing an operator how to cut joint, examine the cross-sections and apply appropriate stresses.

A third method of evaluation, for conventional butt-fusion only, is made non-destructively by ultra-sound. This optional evaluation can also be recorded by the energy management center. A properly made polyethylene pipe joint is stronger than the pipe itself, therefore the joint should not fail.

When an operator has successfully completed training and testing and has performed and evaluated a test joint, he or she is deemed qualified. The energy management center may be equipped and programmed to record and print an appropriate qualification certificate and/or card for each operator that has been deemed qualified.

DOT rules require each operator of the covered task of polyethylene joining procedures to re-qualify every twelve months. To re-qualify, an operator can: (1) perform all the activities described above; (2) use a re-qualification feature contained in the energy management center and use one of his/her routine, on-the-job heat fusion joints as evidence of his or her qualification; or (3) use the energy management center's electro-fusion simulation capability to record an operator's re-qualification activity. This method is most beneficial when re-qualifying to perform electro-fusion because the destruction of an expensive electro-fusion fitting is not required—it is simulated.

When a qualification/re-qualification has been completed, an operator is ready to perform the joining of polyethylene pipe and fittings on the job. The energy management center becomes a workstation, to perform and record which of the various types of polyethylene joints that may be required in the field when constructing or repairing polyethylene piping systems. All types of joints can be checked, verified and recorded by the energy management center, to comply with the DOT code. All necessary joining procedures required by DOT and the local distribution company are on file in the energy management center's system and available to the operator with a touch on the monitor's screen. To comply with the DOT code for documentation, the energy management center provides a complete history of fusion activities performed by the operators. This history is available for review at a job site or at an operating company's office. Included within this history is a record of all operator interaction with the energy management center. For an electro-fusion operation a second by second log of the DC voltage, AC current, AC voltage and ambient temperature is maintained. In addition to this historical data, the operator is provided with a second-by-second graph of the actual electro-fusion process and at the completion of the joining task, a summary sheet of these activities is provided.

This invention provides systems, processes and methods of ensuring regulatory compliance when performing the covered tasks of joining polyethylene pipes and fittings via mechanical and/or heat fusion (conventional/electro-fusion) means that is summarized in the following outline.

Operating Modes

I. Types of Joining (PE Pipes and Fittings)
   A. Mechanical
      1. Compression (cold flow)
      2. Bolt-on (O'Ring seal)
      3. Stab (O'Ring seal)

B. Heat Fusion
1. Conventional
   a. Butt
   b. Socket
   c. Sidewall
2. Electro-fusion
   a. In-line Coupling
   b. Saddle II. Joining Procedures—Operator Specific
A. Mechanical
  1. Training
     a. Audio/Visual Demonstrations
     b. Interactive Multi-Media Instructions
     c. Interactive Multi-Media Testing
     d. Visual Joint Comparison/Evaluation
     e. Destructive Testing Demonstrations
     f. Practical Factor Check-List
  2. Operator Qualification
     a. Procedure Proficiency Determination
     b. Qualification Certificate (Card)
     c. Re-Qualification Notice
  3. Documentation
     a. All Training Activities Recorded
     b. Qualification/Re-Qualification
B. Heat Fusion-Conventional
  1. Training
     a. Audio/Visual Demonstrations
     b. Interactive Multi-Media Instructions
     c. Interactive Multi-Media Testing
     d. Visual Joint Comparison/Evaluation
     e. Destructive Testing Demonstrations
     f. Practical Factor Check-List
  2. Operator Qualification
     a. Procedure Proficiency Determination
     b. Qualification Certificate (Card)
     c. Re-Qualification Notice
  3. Documentation
     a. All Training Activities Recorded
     b. Qualification/Re-Qualification
C. Heat Fusion—Electro-fusion
  1. Training
     a. Audio/Visual Demonstrations
     b. Interactive Multi-Media Instructions
     c. Interactive Multi-Media Testing
     d. Visual Joint Comparison/Evaluation
     e. Destructive Testing Demonstrations
     f Practical Factor Check-List
  2. Operator Qualification
     a. Procedure Proficiency Determination
     b. Qualification Certificate (Card)
     c. Re-Qualification Notice
  3. Documentation
     a. All Training Activities Recorded
     b. Qualification/Re-Qualification
  4. Simulation
     a. All Required Training
     b. Procedure Proficiency
     c. Re-Qualified Without Utilizing Fitting III. Covered Task Performance—Operator Specific
A. Mechanical
  1. "On-Site" Joining Review
     a. Any or All Training Materials
     b. Proper Operating Procedures
     C. Practical Factor Check-List
     d. Visual Joint Comparison
  2. Equipment
     a. Operator Check-List
     b. 120 Vac Provided
  3. Documentation
     a. Task Performed
        1) Operator In-Put
        2) Global Positioning System
     b. Job Site
     c. Location
     d. Date
B. Heat Fusion—Conventional
  1. "On-Site" Joining Review
     a. Any or All Training Materials
     b. Proper Operating Procedures
     c. Practical Factor Check-List
     d. Visual Joint Comparison
  2. Equipment
     a. Operator Check-List
     b. 120 Vac Provided
     c. Checked Heater Surface Temperature (IR)
  3. Documentation
     a. Task Performed
        1) Operator In-Put
        2) Infrared (IR) Thermometer
        3) Global Positioning System
     b. Job Site
     c. Location
     d. Date
C. Heat Fusion—Electro-fusion
  1. "On-Site" Joining Review
     a. Any or All Training Materials
     b. Proper Operating Procedures
     c. Practical Factor Check-List
     d. Visual Joint Comparison
  2. Equipment
     a. Operation Check-List
     b. Power Station
        1) DC/AC Inverter
        2) 120 Vac Supply
        3) 24/40 Vac Regulated Electro-fusion Supply
     c. Bar Code Option
        1) Laser Scanner
        2) Fitting Parameters In-Put
     d. Manual Option
        1) Touch Screen In-Put
        2) Operator Selection
     e. Remote Control (In Ditch)
        1) Visual Prompt
        2) Audio Prompt
        3) Test—Start—Abort Control
     f. Voltage/Current Monitoring
        1) Laptop Real Time Graphs
        2) Remote Control (LCD)
        3) Up/Low Limit Validation
     g. Ambient Temperature Compensation
     h. Total System Operational Test
        1) DC Voltage
        2) AC Voltage
        3) AC Current
        4) Ambient Temperature
     i. Electro-fusion Task Summary
     j. Laptop Computer Console
        1) User Friendly Touch Screen
        2) Interactive Multi-Media
        3) All Operator Activities Documented 3. Documentation
   a. Task Performed
      1) Operator In-Put
      2) Global Positioning System
   b. Job Site
   c. Location
   d. Date
   e. Bar Code Information Thus it can be seen that the invention solves, in unique ways, serious problems that exist with present day heat fused and mechanically joined applications and particularly, provides unique ways to train, test and re-evaluate the skills of a polyethylene pipe and fitting joining practitioner to meet the requirement of the DOT.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A system for ensuring the qualifications of an unsupervised workman to follow proper procedures for performing a covered task that is not subject to routine inspection and for which regulatory authorities have established required standards of proper performance, comprising:
   means for providing the hardware and software for performing a covered task at a selectable remote location;
   means provided by said hardware and software for interactively evaluating the unsupervised performance of a said covered task at said selectable location;
   verifying by means of documenting the results of said interactive performance of said covered task; and
   recording the site of the selectable location by means of a GPS system.

2. A system according to claim 1 wherein said covered task is selected from mechanical, heat fusion and electrofusion.

3. A system according to claim 2 wherein a said mechanical covered task includes compression, bolt-on or stab-on connections.

4. A system according to claim 2 wherein said heat fusion covered task includes butt fusion, socket fusion or sidewall fusion.

5. A system according to claim 2 wherein said electrofusion covered task includes in-line coupling fusion or saddle fusion.

6. A method of documenting the qualifications and performance of an unsupervised workman to follow established procedures in the proper performance of a covered task at a selectable remote location that is not subject to routine inspection, comprising the steps of:
   (a) at the selected location, measuring physical parameters employed by the unsupervised workman in the proper application, of steps required to complete the covered task;
   (b) recording the values of parameters measured in step (a);
   (c) comparing the values recorded in step (b) with established procedures for performing said covered task; and
   (d) providing a record of the results of step (c) to thereby document the qualifications and performance of the workman.

7. A method according to claim 6 wherein step (a) includes measuring the voltage, current, and time of application of voltage applied to electric heat weldable fittings.

8. A method according to claim 6 including measuring the applicable ambient temperature.

9. A method according to claim 6 wherein apparatus used in performing the covered task has thereon a bar code having encoded information relating to said established procedures for (welding application thereof) performing the covered task and including the step of reading said bar code and employing information obtained therefrom to provide at least a portion of said established procedures.

10. A method according to claim 6 including the step of storing said record of the results of step (d).

11. A method according to claim 10 including the step of printing out a permanent record of the results of step (d) whereby the qualifications of a workman can be preserved.

12. A method according to claim 6, including:
    identifying and recording said selectable location.

13. A method according to claim 12, wherein identifying and recording said selectable location includes utilizing global positioning system instrumentation.

14. A system to document the qualification of an unsupervised workman to perform a covered task at a selectable location that is not subject to routine inspection and for which regulatory authorities or industries have established required standards of proper performance, comprising:
    means for providing at said selectable location an environment permitting the workman to physically interact with the subject matter making up the covered task;
    means providing hardware and software by which a workman can properly perform said covered task by the completion of a predefined sequence of steps;
    means permitting the workman to physically perform said steps required to complete said covered task;
    means to provide a performance record of steps taken by said workman in performance of said covered task;
    means employing said hardware and software to evaluate said performance record to provide an indication of the qualification of said workman to properly perform said covered task; and
    means to record, for purposes of documentation, said performance record.

15. A system according to claim 14 wherein said covered task is selected from mechanical, heat fusion and electrofusion covered tasks.

16. A system according to claim 15 wherein said mechanical covered task is selected from compresssion, bolt-on or stab-on connections covered tasks.

17. A system according to claim 14 wherein said covered task is for joining polyethylene pipe and fittings by heat fusion and wherein said heat fusion covered tasks include butt fusion, socket fusion or sidewall fusion and wherein said hardware includes infrared thermometer instrumentation for measuring surface temperature of heat fusable components.

18. A system according to claim 14 wherein said covered task covers in-line coupling fusion or saddle fusion.

19. A system according to claim 14 wherein said covered task includes the application of electrical energy to an electric heat weldable thermoplastic fitting to weld the fitting to a thermoplastic pipe and wherein said hardware includes:

a voltage source;

a microprocessor operated voltage control circuit connected to said voltage source and having an output removably connectable to an electric heat weldable thermoplastic fitting;

an amperage measurement circuit in association with said voltage control circuit for determining current flow through said heat weldable thermoplastic fitting; and an input system connected to said voltage control circuit to impart characteristics of the weldable thermoplastic fitting and ambient conditions, the voltage control system serving to apply proper voltage for a determined time to complete thermoplastic welding of the fitting to a thermoplastic pipe.

20. A system according to claim 19 wherein said covered task includes the application of electrical energy to an electric heat weldable thermoplastic fitting and including;

an ambient temperature circuit forming a part of said input system.

21. A system according to claim 19 wherein said covered task includes controlling the application of electrical energy to an electric heat weldable thermoplastic fitting and wherein said hardware includes;

a sensor for detecting the temperature of said weldable thermoplastic fitting; and a logic circuit responsive to said sensor forming a part of said input system.

22. A system according to claim 19 wherein said covered task includes controlling the application of electrical energy to an electric heat weldable thermoplastic fitting and wherein said hardware includes;

feed-back logic circuitry interconnected between said weldable thermoplastic fitting and said voltage control circuit.

23. A system according to claim 14 wherein said covered task includes controlling the application of electrical energy to an electric heat weldable thermoplastic fitting and wherein said weldable thermoplastic fitting has thereon a bar code having encoded information relating to requirements for to successful welding application thereof and wherein said hardware includes an input system having a bar code reader.

24. A system according to claim 14 wherein said covered task includes controlling the application of electrical energy to an electric heat weldable thermoplastic fitting and wherein said hardware includes an information storage system in communication with an input system by which information as to the parameters employed in the application of an electric heat weldable thermoplastic fitting to a thermoplastic pipe are stored.

25. A system according to claim 14 wherein said covered task includes controlling the application of electrical energy to an electric heat weldable thermoplastic fitting and wherein said hardware includes a printer in communication with an information storage system for providing a print out of details of welding said electric heat weldable thermoplastic fitting to a plastic pipe.

26. A system according to claim 14 including:

means for identifying and recording the location of the site of said covered task.

27. A system according to claim 26 wherein said means for identifying and recording the location of the site of said covered task includes global positioning system instrumentation.

28. A method of documenting the qualifications and performance of an unsupervised workman to properly perform a task for which regulatory authorities or industries have established required procedural standards, referred to as a covered task and that is not subject to routine inspection, comprising:

providing hardware and software for performing said covered task by completion of a predetermined sequence of steps;

permitting the unsupervised workman to perform said covered task employing said hardware and software;

making a record of each step taken by said workman;

providing an evaluation of said record as an indication of the qualification of said workman to properly perform said covered task; and preserving said evaluation as documentation of the workman's qualifications to properly perform said covered task.

29. A method of ensuring the qualification of a workman according to claim 28 in which the covered task is the installation of an electric heat weldable thermoplastic fitting having thereon a bar code having encoded information relating to requirements for the successful installation thereof and including the step of reading said bar code and employing information obtained therefrom in the evaluation of said workman.

30. A method of ensuring the qualification of a workman according to claim 28 including the step of printing out a permanent record of each step employed by said workman whereby if a workman fails to achieve qualification, the reason therefor may be identified.

31. A method according to claim 28 including the step of identifying and recording the location of the site of said covered task.

32. A method according to claim 31 wherein said step for identifying and recording the location of the site of said covered task includes the use of global positioning system instrumentation.

* * * * *